(12) United States Patent
Zinner

(10) Patent No.: US 12,119,925 B2
(45) Date of Patent: Oct. 15, 2024

(54) METHOD FOR OPTIMIZING THE TIME SYNCHRONIZATION BETWEEN NETWORK DEVICES CONNECTED VIA A COMMUNICATIONS NETWORK

(71) Applicant: Continental Automotive GmbH, Hannover (DE)

(72) Inventor: Helge Zinner, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 127 days.

(21) Appl. No.: 17/784,265

(22) PCT Filed: Dec. 4, 2020

(86) PCT No.: PCT/EP2020/084683
§ 371 (c)(1),
(2) Date: Jun. 10, 2022

(87) PCT Pub. No.: WO2021/115962
PCT Pub. Date: Jun. 17, 2021

(65) Prior Publication Data
US 2023/0103012 A1 Mar. 30, 2023

(30) Foreign Application Priority Data
Dec. 12, 2019 (DE) ...................... 10 2019 219 475.3

(51) Int. Cl.
*H04J 3/06* (2006.01)
(52) U.S. Cl.
CPC .......... *H04J 3/0644* (2013.01); *H04J 3/0667* (2013.01)
(58) Field of Classification Search
CPC .............................. H04J 3/0644; H04J 3/0667
See application file for complete search history.

(56) References Cited

U.S. PATENT DOCUMENTS 9,531,530 B2 * 12/2016 Wong ........................ H04L 7/10
9,973,601 B2 * 5/2018 Spada ................... H04J 3/0641
(Continued)

FOREIGN PATENT DOCUMENTS

DE 102012216689 A1 5/2014
DE 102013224697 A1 6/2015
(Continued)

OTHER PUBLICATIONS

J. Farkas "Introduction to IEEE 802.1 Focus on the Time-Sensitive Networking Task Group", Presentation, 2018.
(Continued)

*Primary Examiner* — Bailor C Hsu

(57) ABSTRACT

In a system of control devices networked with one another via a first network or multiple first sub-networks, and of which at least one is a server-based control device that combines multiple functional units, a grandmaster clock is defined by ascertaining the best clock of the entire network. If the best clock is located in a server-based control device, the distances are ascertained between selected functional units that are suitable as a source of the grandmaster clock and selected active network interfaces that connect the server-based control device to the first network or multiple first sub-networks, and the average distance to all selected network interfaces for each of the selected functional units is determined. That selected functional unit that has the smallest average distance to all selected network interfaces is defined as grandmaster clock for the first network or the first sub-networks.

25 Claims, 5 Drawing Sheets

(56) References Cited

U.S. PATENT DOCUMENTS

| | | | |
|---|---|---|---|
| 10,372,647 B2* | 8/2019 | Lovett | G06F 13/4022 |
| 11,381,375 B1* | 7/2022 | Byagowi | H04L 7/0008 |
| 2012/0275501 A1* | 11/2012 | Rotenstein | H04J 3/0667 |
| | | | 375/220 |
| 2012/0281520 A1 | 11/2012 | Ansari et al. | |
| 2013/0208735 A1* | 8/2013 | Mizrahi | H04J 3/0664 |
| | | | 370/503 |
| 2014/0185632 A1 | 7/2014 | Steiner et al. | |
| 2015/0071309 A1* | 3/2015 | Aweya | H04J 3/0664 |
| | | | 370/503 |
| 2016/0094335 A1 | 3/2016 | Roberts et al. | |
| 2016/0294545 A1 | 10/2016 | Wong et al. | |
| 2018/0059712 A1* | 3/2018 | Kazehaya | G06F 1/12 |
| 2019/0173596 A1 | 6/2019 | Chen et al. | |
| 2019/0236940 A1 | 8/2019 | Schwarz et al. | |
| 2020/0295861 A1 | 9/2020 | Zinner | |
| 2020/0304224 A1* | 9/2020 | Neugeboren | H04L 43/0858 |
| 2021/0006344 A1* | 1/2021 | Chen | H04J 3/0641 |
| 2021/0120386 A1 | 4/2021 | Zinner et al. | |
| 2021/0167941 A1* | 6/2021 | Yamaguchi | H04L 7/0016 |

FOREIGN PATENT DOCUMENTS

| | | |
|---|---|---|
| DE | 102017219209 A1 | 5/2019 |
| DE | 102018205264 B3 | 10/2019 |
| EP | 3016306 A1 | 5/2016 |
| JP | 2006135975 A | 5/2006 |
| JP | 2014520419 A | 8/2014 |
| JP | 2017529806 A | 10/2017 |
| WO | 2017198304 A1 | 11/2017 |
| WO | 2020020932 A1 | 1/2020 |
| WO | 2020020936 A1 | 1/2020 |

OTHER PUBLICATIONS

Lucia Lo Bello et al. "A Perspective on IEEE Time-Sensitive Networking for Industrial Communication and Automation Systems", Proceedings of the IEEE, vol. 107, No. 6, Jun. 2019, S. 1094-1120, ISSN 1558-2256IEEE, 2019.

Kevin B. Stanton "The Time Synchronization Standard from the AVB/TSN suite", IEEE Plenary, San Diego CA, Jul. 2014, pp. 1-45, IEEE, 2014.

Georg Gaderer et al. "Improving Fault Tolerance in High-Precision Clock Synchronization", IEEE Transactions on Industrial Informatics, vol. 6, No. 2, May 2010, IEEE Service Center, New York, NY, US, XP011334313, ISSN: 1551-3203, DOI: 10.1109/TII.2010.2044580, IEEE, 2010.

Jeon Younghwan et al. "An Efficient Method of Reselecting Grand Master in IEEE 802.1AS", The 20th Asia-Pacific Conference on communication (APCC2014), IEEE Oct. 1, 2014 (Oct. 1, 2014), pp. 303-308, XPO32765584, DOI: 10.1109/APCC.2014.7091652, 2014.

"IEEE Standard for a Precision Clock Synchronization Protocol for Networked Measurement and Control Systems", IEEE Instrumentation and Measurement Society, Norm IEEE 15888-2008, IEEE, 2008.

Kevin B. Stanton et al. 802.1AS Tutorial, Presentation, http://www.ieee802.org/1/files/public/docs2008/as-kbstanton-8021AS-overview-for-dot11aa-1108.pdf, IEEE-SA, Piscataway, NJ, USA, 2008.

Office Action dated Aug. 18, 2020 from corresponding German patent application No. 10 2019 219 475.3.

International Search Report and Written Opinion dated Mar. 11, 2021 from corresponding International patent application No. PCT/EP2020/084683.

Rule 71(3) communication dated Jul. 10, 2023 from corresponding European patent application No. 20820392.7.

Notice of Allowance dated Jul. 18, 2023 from corresponding Japanese patent application No. 2022-535563.

* cited by examiner a)

b)

c)

METHOD FOR OPTIMIZING THE TIME SYNCHRONIZATION BETWEEN NETWORK DEVICES CONNECTED VIA A COMMUNICATIONS NETWORK

BACKGROUND

The present invention relates to communication networks containing network devices synchronized with one another.

Ethernet technologies are used in many fields in which computers are networked with one another, and are also increasingly being used in vehicles, where they are replacing older or proprietary data connections and data buses.

On layer 3 of the OSI layer model, Ethernet connections support a large number of switching protocols for the transmission of data packets between transmitters and receivers. In the higher protocol layers, the segmentation of the data flow into packets, the process communication between communicating systems, the translation of data into a system-independent form and finally the provision of functions for applications take place. Even a comparatively small network of networked devices located spatially close to one another may already have a large number of routers and switches that route data packets coming from transmitters to the correct receivers.

As in other networks, in addition to the nominal speed of the network components and interfaces, latencies or delays in Ethernet networks may also have a major impact on the amount of data actually able to be transmitted per unit of time and the duration of the transmission from the transmitter to the receiver.

Latencies or delays may have different sources and causes. Sources for delays in a transmission of data in a network are in particular the so-called transmission delay, that is to say the time that a transmitter needs to send a data packet on a communication connection or a link. This delay may depend, inter alia, on the length of the data packet and the bandwidth or speed of the network.

The signal propagation time, or propagation delay, denotes the time required by a signal sent by a transmitter over a communication connection to arrive at a receiver. This delay depends above all on the distance between transmitter and receiver and the propagation speed of the signal. The propagation speed of radio waves in a vacuum or of light waves in optical fibers corresponds to the speed of light, but in copper lines the propagation speed of the signals may drop to up to two thirds of the speed of light, depending on their construction.

The switch latency may also play an important role in the usable data rate. This applies in particular to networks supporting high-performance and cluster computing applications, where there is an advantage in minimizing either the overall delay or the variation in the delay in the communication path between communicating pairs or groups of endpoints. In many cases, the switch latency may have a much greater impact on application or service performance and user experience than the nominal bandwidth of the connection.

The switch latency time denotes the time required by an Ethernet packet to pass through an Ethernet switch. Although it is simple in concept, there are in practice a number of factors that may cause the actual latency experienced by a packet to vary significantly, sometimes by orders of magnitude.

The switch latency time is measured between an input port and an output port on an Ethernet switch. It is strongly dependent on the used switching paradigm of the switch: cut-through or store-and-forward.

Store-and-forward requires the entire packet to be received by the switch and buffered before a forwarding decision is made and the packet transmission begins via the output port. For certain forwarding operations, for example routing of packets on layer 3, store-and-forward mode may be required when complex options are required in a packet forwarding operation.

Cut-through forwarding, on the other hand, allows packet transmission via the output port as soon as enough data have been received to make the forwarding decision. For example, in the case of simple layer 2 forwarding, this may be performed as soon as the destination MAC address has been received and looked up to determine the associated output port. The cut-through forwarding is decided on by a switch on a packet-by-packet basis.

Cut-through forwarding may enable lower-latency forwarding in a switch, which is largely independent of packet length. However, cut-through forwarding is possible only under certain conditions. Cut-through forwarding may for instance be performed only between interfaces operating at the same speed, for example when connecting 1 Gbps-to-1 Gbps interfaces. It is not possible to connect between interfaces of different speeds, such as for example between 1 Gbps and 100 Mbps interfaces. Cut-through forwarding may also be performed only when the output port is idle, that is to say has not been "stopped" by data flow control, and has no pending frames queued for transmission.

It is easy to see that there may often be contention on a port when multiple packet flows in a network with interfaces with different speeds are destined for this port, even if the aggregate bandwidth required by these flows is less than the nominal link capacity, and that therefore, in many cases, less data is forwarded than would be theoretically possible using cut-through forwarding.

Modern layer 2 or layer 3 switches typically achieve a latency time ranging from hundreds of nanoseconds to a few tens of microseconds. The wide spectrum of latency times is primarily the result of the switch architecture and design, although even larger differences in latency times may occur depending on the application case. For example, the number of ports that are used simultaneously and the type of traffic, for example one-to-one traffic, in which no packet flows compete for output ports, or fully meshed traffic, in which all traffic competes for output ports, have a large impact on the latency times, since, in the case of fully meshed traffic, data packets may be buffered in a switch queue for a relatively long time if there is competition for a port.

Switch latency is often also cited in connection with the so-called queuing delay, in which the delay of all waiting times in switches located on the communication route is summed.

In switches, routers or other network devices that forward data, this is exacerbated by the so-called processing delay, which means the time required for evaluating a packet header or for error correction measures, etc. In high-speed routers and switches, the processing delay is of the order of magnitude of microseconds or less.

The total time required by a data packet to travel from a transmitter to a receiver is thus the sum of the transmission delay, the signal propagation time, the queuing delay and the processing delay. The more frequently a signal is received, evaluated and/or processed by a switch or another network device and forwarded only thereafter, the longer it takes to arrive at the actual receiver.

In many networks, some of the delays are comparatively short and, above all, largely constant, for example the signal propagation time, which changes only if the distance between transmitter and receiver changes, or if the route of a connection changes such that the total distance becomes longer or shorter. In a network having sub-routes of a known length, the signal propagation time may be determined comparatively accurately from the known distances of individual segments of the route, even in the case of changing routes.

Other delays are less constant and also not predictable, for example the switch latency, which is strongly dependent, inter alia, on the amount, possibly the priority and the times, of the data pending transmission via a physical network interface at one time.

In many networks, it is necessary to synchronize the timers present in the network devices, in particular including in networks of vehicles, where the time-synchronized acquisition of sensor data is required for safe operation. Almost all Ethernet communication networks used in vehicles to this end use a time synchronization protocol that provides a global network time base that is synchronous in all network devices. The prevalence of time-synchronized network devices in vehicles and in other fields of application is expected to continue to increase in the future.

The IEEE 802.1AS standard provides one such time synchronization protocol, which is also known by the acronym gPTP for "generalized Precision Time Protocol". Proceeding from a so-called "best clock" in the network, also referred to as a grandmaster or grandmaster clock, a master-slave clock hierarchy is set up. The grandmaster in this case provides the time base for the network, to which all other network devices in the network are synchronized.

The three basic functions of the generalized Precision Time Protocol, determination of the best clock, exchange of time information and measurement of the propagation time on a connection line between neighbour nodes, are shown in FIG. 1.

The grandmaster is determined by way of the so-called Best Master Clock algorithm (BMCA) and is announced within the network. To do this, IEEE 802.1AS-capable network devices cyclically transmit Announce messages containing information about their internal clock to other network devices that are directly connected. The information about the internal clocks provides an indication of the accuracy of the respective clock, the reference or time reference thereof and other properties that may be used to determine the best clock in the network. Such an Announce message is illustrated by way of example in FIG. 1a). A receiver of such an Announce message compares the information received with the features of its own internal clock and any messages already received from another port with information relating to clocks of other network devices, and accepts a clock in another network device if it has better clock parameters. After a short time, the best clock in the network has been ascertained, which then becomes the grandmaster in the network, and a time synchronization spanning tree has been created. In this process, each port of a network device is assigned one of four port statuses. The port that has a shorter path to the grandmaster than its link partner is assigned the "master port" status. The "slave" status is assigned when no other port at this node has this status yet. Disabled is selected by the port that cannot fully support the PTP protocol. The "passive" status is selected if none of the other three statuses apply.

Based on the grandmaster, time synchronization messages are broadcast over the network. The Sync_Follow_Up mechanism, which is illustrated schematically in FIG. 1b), is used for this purpose. The master ports cyclically transmit Sync and Follow_Up messages to the respective neighboring link partner. When the Sync message leaves the master port, a timestamp is generated and is immediately transmitted in a subsequent Follow_Up message. This timestamp corresponds to the current clock time of the grandmaster at the transmission time of the Sync message.

A network device that receives a time synchronization message does not simply forward it, but rather corrects the time information for the previously ascertained propagation time on the connection by way of which it receives time synchronization messages from a directly connected network device, and also for the internal processing time, before it creates and retransmits a new time synchronization message with the corrected time information. This correction takes place in so-called "time-aware" systems in each network node, that is to say also in appropriately configured routers and switches.

The so-called "peer delay mechanism", which is shown by way of example in FIG. 1c), is used to determine the delay between two connected ports. One port, the initiator, starts measuring the line delay by transmitting a Delay_Request message to the port, directly connected thereto, of a network device, the responder, and generating an initial timestamp with the time $t_1$. This initial timestamp denotes a hardware timestamp that is written via the Ethernet transceiver as late as possible before the actual transmission of the time synchronization message. When the time synchronization message arrives, the responder generates a timestamp $t_2$. In response, the responder transmits a Delay_Response message. In this message, it transmits the reception timestamp $t_2$ of the Delay_Request message. When this message leaves the responder, the responder in turn generates a timestamp $t_3$, which is sent out in an immediately subsequent Delay_Response_Follow_Up message. When the initiator receives the Delay_Response message, it generates a timestamp $t_4$. The initiator may use the four timestamps $t_1$ to $t_4$ to calculate the average propagation time on the communication route.

Since the propagation time on a connection route may vary depending on the direction, Delay_Request messages are sent cyclically by both communication partners independently of one another.

In the case of the clock hierarchy according to IEEE 802.1AS and the "generalized precision time protocol" (gPTP) defined therein, only a single network device always provides the best clock in the network. This network device therefore controls and regulates the whole time of the vehicle. All other clocks in network devices in the network are governed exclusively by this one clock. Some vehicle manufacturers even synchronize networks of other standards, for example CAN, by way of this Ethernet time master, which means that almost all network devices in the vehicle are informed of the system time by the network device that provides the grandmaster.

The grandmaster clock cyclically transmits time synchronization messages to directly connected network devices, which correct the time information for the previously determined propagation time on the transmission route and the internal processing time before they in turn retransmit received time synchronization messages to other directly connected network devices. The corrections to the time information cannot guarantee that every timer of a network device actually runs in absolute synchronicity with the grandmaster clock, because any correction of the time information inevitably leads to deviations, including due to the different time drift of the timers and also other hardware properties, which may lead to inaccuracies when determining the propagation times and delays and the like. With each forwarding operation of a time synchronization message, the possible deviation of the time information from the reference signal of the grandmaster clock increases accordingly, that is to say the accuracy of the synchronization decreases with each forwarding operation.

In many application cases, including inter alia in vehicles with a high degree of driver support by appropriate systems or with systems for partly or highly automated driving, a large volume of sensor data acquired within a narrow time window must be processed together in order to derive appropriate control signals for actuators of the vehicle. The most accurate possible time registration for sensor data may also be of great importance for documentation purposes, for example when storing in log files that may be analyzed in order to reconstruct malfunctions or operating errors. The latter is of great interest for debugging in distributed systems, but also in particular for insurance companies and law enforcement authorities. Therefore, a reliable and above all as precisely as possible synchronized provision of time information is indispensable for so-called "hard" real-time support. The more accurate the synchronization of the clock time, the better the results of related functions, such as for example sensor fusion.

This is particularly problematic for precise time synchronization if a switch in a server-based control device is not IEEE 802.1AS-capable, that is to say the switch is not able to correct time synchronization messages for the propagation time of the signal from the transmitter before retransmission, and above all not for the switch delay. The signal propagation time could possibly still be neglected in the case of transmitters and receivers that are spatially close to one another, or ascertained statistically between transmitters and receivers connected via a switch that is not IEEE 802.1AS-capable. However, the time delay occurring as a result of buffering depending on the network traffic routed via the switch cannot be determined in a sensible manner, or is able to be determined in a sensible manner only with great effort, meaning that the time information in time synchronization messages routed via such switches exhibits considerable inaccuracy.

Even in IEEE 802.1AS-capable switches, deviations may occur when correcting the time information as required before forwarding the time synchronization messages, which deviations, even if they are only small in individual cases, sum together to give an ever-increasing possible inaccuracy with each forwarding operation.

FIG. 2a) shows a schematic example of the change in the possible deviation of time information in network devices that are synchronized in accordance with IEEE 802.1AS. In FIG. 2a), network device 100 provides the grandmaster clock and retransmits the time synchronization messages to network device 102. Network device 102 corrects the time information before transmitting a corresponding time synchronization message to network device 104. In the correction, network device 102 uses the previously ascertained propagation time on the connection with network device 100, and also information about an internal delay that depends, inter alia, on the implementation of the time synchronization and hardware properties of the network device. A timing diagram is shown next to the network devices, which illustrates the time sent out by network device 100 and the possible deviation after each further transmission. After the first correction, the originally single dash, which represents the time of the time synchronization message transmitted by network device 100, has already been supplemented by further dashes to the left and right. These additional dashes indicate that there may be a certain deviation in the correction. Network device 102 forwards the time information, impacted by a certain first possible deviation, to network device 104. Network device 104 in turn corrects the received time information, wherein again a certain deviation in the correction cannot be ruled out, and forwards this time information to network device 106 in a time synchronization message. The possible deviation, which has again increased, of the time information from the time actually present in the grandmaster clock is represented by the wider possible deviation range in comparison with the timing diagram associated with network device 102. The direction in which the time synchronization messages are forwarded is indicated by the arrows between the network devices.

With each correction and forwarding operation, the possible deviation range thus increases. This does not mean that a deviation always has to be at the outer edge of the deviation range, and that deviations continue to increase; there may very well be a correction—albeit not controllable—in an opposite direction, meaning that the time in the last network device in the chain matches the time of the grandmaster clock more accurately than the time in a network device located closer to the grandmaster clock. However, since this cannot be predicted, the worst-case scenario must be assumed.

A smaller number of forwarding operations of the time synchronization message from a clock that is not the best clock in the network according to the BMCA may therefore, in some application cases, have advantages over a clock that has, if even only slightly, objectively better properties, but whose time synchronization messages require a larger number of forwarding operations to pass through the entire network. This is also because, inter alia, the Best Master Clock algorithm does not, or could not, evaluate the overall system.

In addition, each active component located on the path of a message from the transmitter to a receiver increases the risk of the path being interrupted, which is undesirable especially for security-relevant communication between network devices.

New server-based electrical and electronic architectures that are being introduced in many fields of industry are concentrating an increasing number of logic and control functions in an increasingly small number of control units. These control units, also referred to as servers or central computers, no longer comprise just a single microcontroller or microprocessor like a conventional control computer, but have a large number of microcontrollers, microprocessors, systems-on-chip (SoC) and the like, which are arranged in a shared housing in order to protect against environmental influences and mechanical damage. These control units are referred to as server-based control devices below. Ethernet networks with appropriate switches may be provided in order to connect the functional units arranged in the shared housing. The individual functional units may in this case be connected directly to a port of the Ethernet switch, that is to say without an Ethernet plug plugged into a corresponding socket, and correspondingly also without conversion of the signal level as required via an Ethernet line and other signal processing in a so-called PHY module that forms the connection to the physical layer. Such a connection may be made for example via a so-called backplane, or via appropriate sets of cables, which establish the electrical connection between the Ethernet interface of a functional unit and a port of an Ethernet switch. It is also conceivable for multiple functional units and Ethernet switches to be arranged on the same circuit board and to be connected directly to conductor tracks running on the circuit board. A connection via known physical Ethernet connections and corresponding cables is of course also possible.

Depending on the number of functional units combined in a housing of a server-based control device, the number of ports of the Ethernet switches may be 20 or even more. At least one port of the one or more Ethernet switches is routed out of the housing and connected to a network. The ports routed out of the housing have physical interfaces implemented via a PHY module and which take responsibility for converting the signal level and other signal processing.

The PHY module provides mechanical, electrical, and other functional auxiliary means for activating and deactivating physical connections, maintaining same and transmitting bits across same. The physical layer is therefore also referred to as bit transmission layer. Devices and network components that are assigned to the bit transmission layer are for example transceivers, amplifiers, plugs and sockets for the network cable. On the bit transmission layer, the digital bit transmission takes place on a wired or wireless transmission route. A transmission medium may be shared on this layer by static or dynamic multiplexing. In addition to the specifications of particular transmission media, such as for example copper cables, fiber-optic cables, the power grid, and the definition of plug connections, this also requires other elements. In addition, the way in which a single bit should be transmitted has to be resolved on this level: In computer networks, information is transmitted in the form of bit sequences or symbol sequences. In copper cables and in radio transmission, modulated, high-frequency electromagnetic waves are the information carriers; in fiber-optic cables, these are light waves of one or more specific wavelengths. Depending on the modulation, the information carriers may not only adopt two states for zero and one, but possibly many more. A code therefore has to be defined for each type of transmission. Adapting the signals to be transmitted to the transmission medium may entail a significant latency.

The functional units arranged in a housing of a control unit, each of which may have software or firmware executed independently of other functional units, are connected to one another in the manner described above by a local area network and may have a common power supply. In this case, there is no information in the individual functional units that could be used to directly ascertain whether they are connected to a network via a PHY module or that they are arranged in the same housing as other components.

It is easy to see that, in a server-based control device in which a relatively large number of functional units are housed together and are connected to one another via one or more switches, time synchronization messages of a non-expediently placed grandmaster clock experience a large and often unpredictable latency before they are actually transferred to the "external" network. This may limit the usefulness of data acquired at more remote network devices of the network, in particular when an acquisition time that is as accurate as possible or data acquisition synchronized with other network devices is important to the results of collaborative processing, which is also referred to as sensor fusion.

The object of the invention is therefore to specify a method and a device implementing the method that offer optimization of the time synchronization between network devices connected via a communication network.

BRIEF SUMMARY

This object is achieved by the method and the server-based control device specified in the independent claims. Embodiments and further developments are specified in respective dependent claims.

The method according to the invention for defining a grandmaster clock, which is carried out in a system of control devices networked with one another via a first network or multiple first sub-networks, firstly comprises ascertaining the best clock of the entire network. This may be achieved for example by executing the BMCA in accordance with IEEE 802.1AS.

At least one of the control devices networked with one another is a server-based control device, which combines multiple functional units that are suitable as a source of the grandmaster clock and are connected in terms of communication within the server-based control device by way of a second network via switches in one physical unit. The server-based control device is connected to the first network or to multiple first sub-networks via one or more network interfaces. The one or more network interfaces may originate from a switch of the server-based control device or from one of the functional units. The first network or the first sub-networks are therefore located outside and the second network is located within the server-based control device.

If the previously ascertained best clock of the entire network is located in a server-based control device, the method furthermore comprises ascertaining the distances between selected functional units, which are suitable as a source of the grandmaster clock, and selected active network interfaces, which connect the server-based control device to the first network or multiple first sub-networks.

The basic suitability as a source of the grandmaster clock may for example be ascertained by analyzing the Announce messages of the PTP protocol. Another option is to send PDelay messages to the respective neighboring components or to start measuring the propagation time delay of the connection. From the result of these measurements, it is possible to ascertain the path of the time synchronization messages and identify which functional unit actually supports or is able to execute a time synchronization protocol.

Selected functional units may comprise any functional units of the server-based control device that are suitable as a source of the grandmaster clock, that is to say any functional units that have an internal timer and may be configured so as to execute computer program instructions necessary to provide the grandmaster clock. As an alternative, selected functional units may comprise those functional units of the server-based control device whose timers meet predetermined minimum demands. For example, it is possible to consider only those functional units whose timers have clock parameters that are equivalent or only slightly worse than the grandmaster clock ascertained by the Best Master Clock algorithm. In a further alternative, selected functional units may comprise those functional units of the server-based control device that forward the time synchronization messages of the grandmaster clock ascertained by the Best Master Clock algorithm to one of the selected active network interfaces. In the latter case, in order to ascertain the selected functional units, path information may for example be read from the synchronization messages or, if the path should be known, this information may be known from the system configuration.

Selected active network interfaces may comprise any network interfaces of the server-based control device to the first network or the first sub-networks via which data are at least sporadically transmitted or received between startup and ending of operation of the system, that is to say via which at least one further control device is able to be reached at least temporarily. As an alternative, selected active network interfaces may comprise those network interfaces that connect the server-based control device to first sub-networks to which control devices that execute a time-critical application are connected. Control devices that execute a time-critical application may indicate this for example through appropriate messages when the network is initialized.

The distance between a selected functional unit and a selected network interface may be characterized for example by the number of packet forwarding operations via intermediate functional units or switches or the like, or by the length of a communication line, that is to say the signal propagation time on the communication line. The distance may also have a factor that describes for example a fluctuation in a delay in transmission and/or reception modules between two functional units, and which virtually increases the distance for the purposes of the method according to the invention if there is a relatively large fluctuation. A network interface that establishes a connection to the first network or to one of the first sub-networks may be identified for example via propagation time measurements. This makes use of the fact that the distances between functional units within the server-based control device are usually considerably shorter than the connections of the network interfaces to control devices connected to the first network or a first sub-network via network cables. The signal propagation time on the cable is noticeably longer. In addition, components by way of which the network interface connects the first network or a first sub-network may add additional delays, for example the so-called PHY latency, which do not occur in the case of connections within the server-based control device.

If this information is not present in the functional units of a server-based control device as configuration information or the like, the control devices of a network may also use the measurement of the propagation times between directly interconnected ports to determine whether they are functional units of a server-based control device. Between functional units that are directly connected to one another "phy-less" via a circuit board or a backplane, there will be a significantly lower latency than control devices that are connected via a PHY module and a longer connection medium, for example a network cable.

The method according to the invention furthermore comprises determining the average distance to all selected network interfaces for each of the selected functional units, and defining that selected functional unit that has the smallest average distance to all selected network interfaces as defined grandmaster clock for the entire network. The defined grandmaster clock then serves as the grandmaster clock for the first network or the first sub-networks and transmits corresponding time synchronization messages into these networks.

The smallest average distance may be formed for example by summing the distances to the selected network interfaces and dividing the sum by the number of selected network interfaces. A weighting of the distances of individually selected network interfaces according to accuracy demands of the control devices connected via them is also conceivable.

In embodiments of the method according to the invention, the defined grandmaster clock may synchronize itself within the server-based control device with the grandmaster clock ascertained by the Best Master Clock algorithm. The grandmaster clock ascertained by the Best Master Clock algorithm may in this case set up a base time domain that applies at least to the functional unit that, as defined grandmaster clock, transmits the time synchronization messages into the first network or the first sub-networks. Time synchronization messages of this base time domain do not have to be forwarded outside of the server-based control device. The defined grandmaster clock may in this case use the domain number 0 of a grandmaster clock in accordance with the IEEE 802.1AS standard to the first network or the first sub-networks and transmit its own identification. Since all functional units of the server-based control device have software that tolerates or supports this procedure, the first network or the first sub-networks are still compatible with standardized time synchronization methods and protocols.

A functional unit of a server-based control device configured so as to carry out at least parts of the method described above comprises a microprocessor, volatile and non-volatile memory, a synchronizable timer and at least one communication interface, which are connected to one another in terms of communication via one or more data lines or data buses. The communication interface connects the functional unit to other functional units arranged in the server-based control device. This connection may be made directly or via routers or switches.

A server-based control device configured so as to carry out aspects of the method described above accordingly comprises multiple functional units connected to one another in terms of communication via a second network. The second network may comprise one or more switches. A network interface of a functional unit or of a switch connects the second network to a first network that is located outside of the server-based control device. It is also conceivable for multiple network interfaces of functional units or switches to connect the second network to in each case one of multiple first sub-networks, which are located outside of the server-based control device. Two or more of the functional units or switches are configured so as to carry out at least parts of the method described above.

The relocation of the grandmaster clock, as proposed in the present method, closer to an interface of a server-based control device to a network connected thereto may achieve higher accuracy of the time synchronization in certain application cases, which may be advantageous above all in vehicle networks, for example if certain sub-networks have greater demands on the accuracy of the time synchronization than other sub-networks. This is easily recognizable in FIG. 2b) in comparison with the example from FIG. 2a) described further above: It is assumed that network device 104 is that network device that provides a network interface to a network located outside of a server-based control device, and in which there are connected control devices that place particularly high demands on the accuracy of the time synchronization. The assignment of the grandmaster clock to network device 104 then leads to the number of forwarding operations of time synchronization messages into the external network being smaller. Forwarding operations within the server-based control device may also lead to delays there, but the timestamps of data from the network devices 106, 108 or 110 have smaller maximum possible deviations from one another than in the example described with reference to FIG. 2a). It may be clearly seen that the maximum deviation ranges shown next to the respective network devices have become smaller. Starting from network device 104, time information is corrected at most three times, while it is corrected up to five times in the system shown in FIG. 2*a*).

Even in networked systems in which sub-networks may be dynamically activated or deactivated—with the grandmaster clock ascertained by the BMCA otherwise remaining unchanged—the relocation of the grandmaster clock closer to an interface of a server-based control device to a network connected thereto may entail advantages. If for example a sub-network connected to a first network interface of a first functional unit of the server-based control device and having high demands on the accuracy of the time synchronization is deactivated, a relocation of the grandmaster clock within the server-based control device closer to a second network interface via which another, still active sub-network is connected may offer better accuracy of the time synchronization for this sub-network. The same applies if an application or function with high demands on the accuracy of the time synchronization is moved between control devices connected in different sub-networks. In this case, it may be advantageous for the grandmaster clock to be relocated within a server-based control device closer to the network interface to which the control device executing the application or function is connected.

The method according to the invention in this case uses standardized time synchronization methods, such that any interaction with other network devices may take place in accordance with a standard. Changes to the time synchronization by the method according to the invention take place only within a control device that is closed to the network and that has been developed as a unit and whose software components may be adapted and tested as appropriate during development. Changes to the hardware or additional components are not required in this case.

The relocation also has the advantage of reducing the likelihood of failure of the time synchronization by a grandmaster clock located within the server-based control device because the time synchronization messages are routed via a smaller number of active components before they enter the first network.

With suitable prioritization of control devices connected to particular sub-networks or functions or applications provided thereby, it is possible to achieve a better accuracy of the time synchronization for them. In particular, the fusing of data from different sensors, for example camera and radar or lidar, may thereby be improved.

Knowledge gained while carrying out the present method, such as for example information about which functional units of the server unit, which likewise behave like other control devices in the network, are located within a housing and which are connected via a cable connection, may also be used to efficiently improve system security. A cable connection is considerably easier to eavesdrop on by monitoring the signals than a line on or within a circuit board, in particular if unauthorized opening of the housing is prevented or at least identified through suitable precautions. This information may be used for example to preferably implement corresponding switches for identifying an unauthorized interposed network device on those network devices that also actually have freely accessible interfaces or communication connections. Valuable computing resources may thus be saved.

The distance between a port of a functional unit of a server-based control device and a network interface that establishes a connection to an external network may be stored as a distance index in a topology map of a network. For example, a port or a network interface that is connected directly to the external network may be assigned the distance 0, and ports or interfaces located further away within the server-based control device are assigned correspondingly incrementally higher distances. If a topology map of a system is available, the distance index may be used for positioning the grandmaster clock according to the invention. The distance index may also be used when ascertaining probabilities of failure and inaccuracies of the time synchronization.

BRIEF DESCRIPTION OF THE DRAWINGS

The invention will be explained below by way of example with reference to the drawings.

Identical or similar elements may be referenced using the same reference signs in the figures.

DETAILED DESCRIPTION

Figure 1:
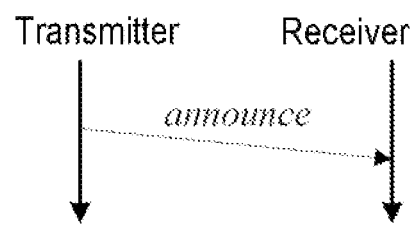
FIG. 1 shows message flows in accordance with the IEEE 802.1AS standard.
Figure 1:
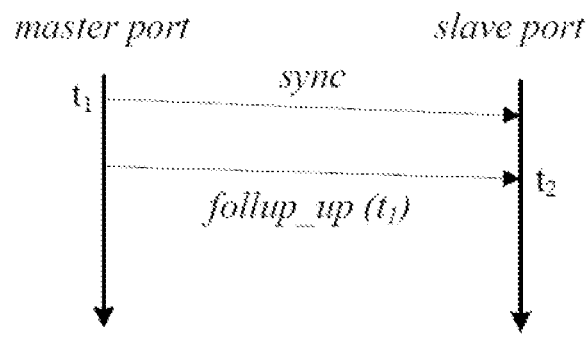
Figure 1:
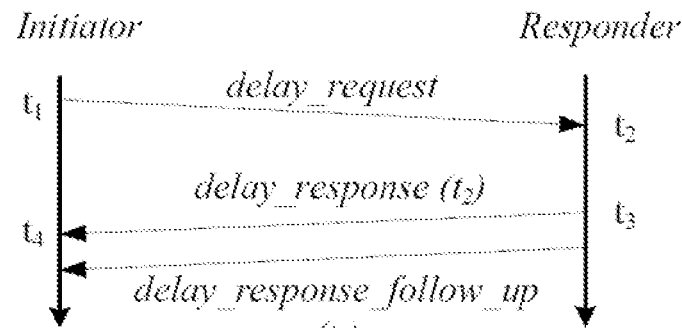
Figure 2:
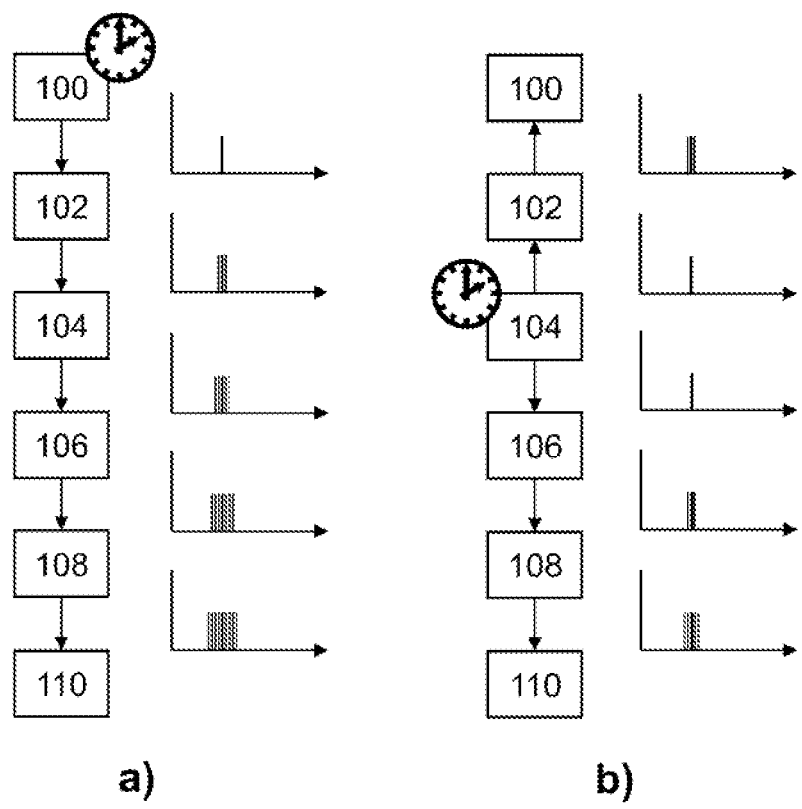
FIG. 2 shows schematic examples of the change in the possible deviation of time information in network devices that are synchronized in accordance with IEEE 802.1AS.

FIGS. 1 and 2 have already been described above and will therefore not be discussed again.

Figure 3:
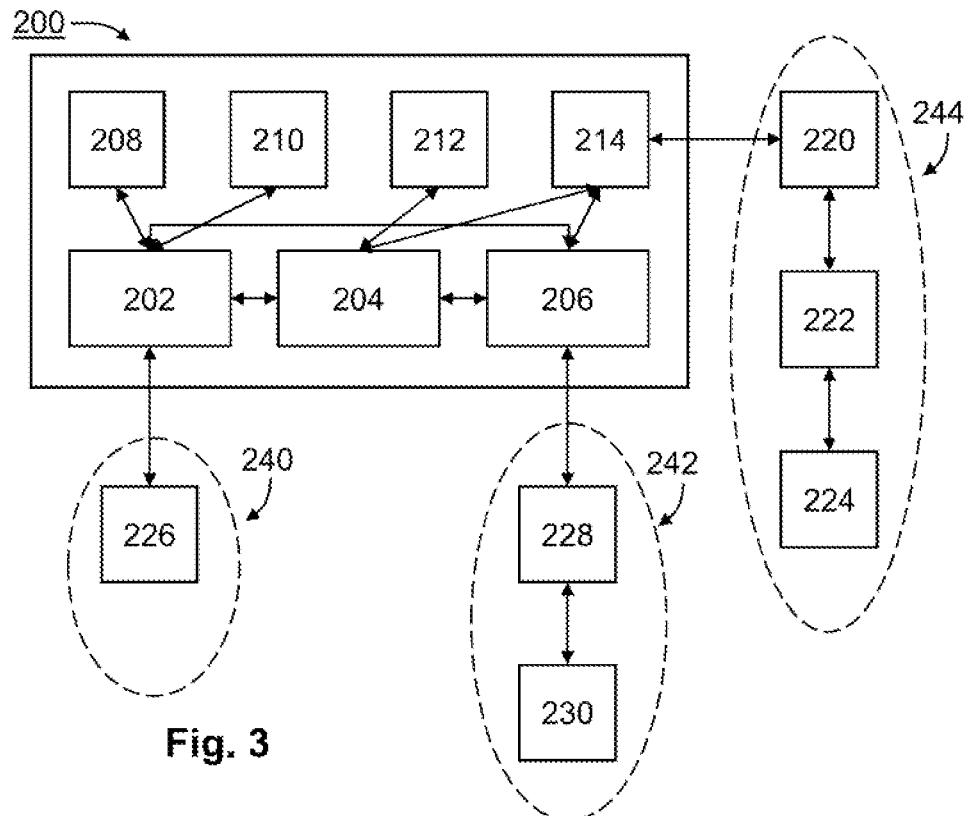
FIG. 3 shows an exemplary block diagram of a system containing a server-based control device and sub-networks.

FIG. 3 shows an exemplary block diagram of a system containing a server-based control device 200 and sub-networks 240, 242, 244. The server-based control device 200 comprises multiple functional units 208, 210, 212, 214 that are connected to network switches 202, 204 and 206. The network switches 202, 204 and 206 are interconnected, such that there is an internal sub-network within the server-based control device that connects the functional units 208, 210, 212, 214 and the network switches 202, 204 and 206 to one another. In addition to one or more network interfaces, a functional unit may in this case comprise a microcontroller or microprocessor and associated memory and may execute a program-controlled function.

A functional unit may be connected to a network switch, such as for example functional unit 208 and network switch 202, or functional unit 212 and network switch 204, but a functional unit may also be connected to two network switches, such as for example functional unit 214 and network switch 206.

One or more network switches may have network interfaces that connect the internal sub-network to sub-networks located outside of the server-based control device, for example the network switches 202 and 206.

A functional unit may itself also have a network interface that connects a sub-network located outside of the server-based control device, such as for example functional unit 214, to which the sub-network 244 is connected. Functional unit 214 may in this case establish the connection to the internal sub-network of the server-based control device.

Sub-network 240 comprises a control device 226, sub-network 242 comprises the control devices 228 and 230, and sub-network 244 comprises the control devices 220, 222, 224. Control devices 220, 222, 224, 226, 228 and 230 may be for example sensors, actuators or other server-based control devices.

Figure 4:
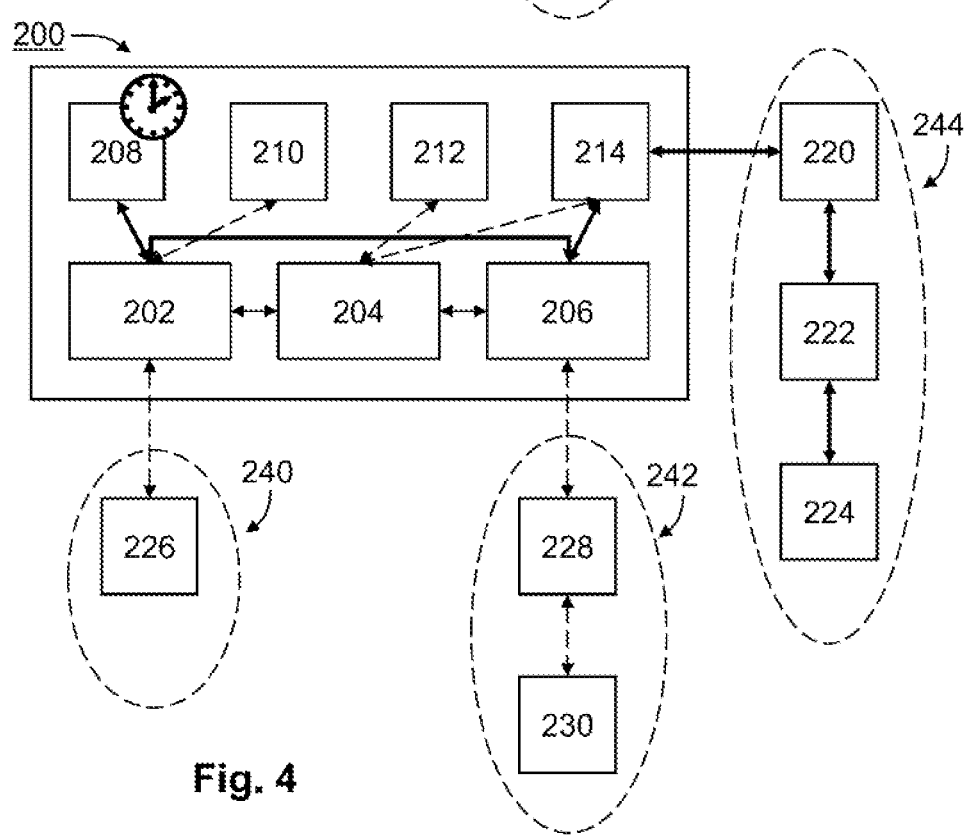
FIG. 4 shows the system from FIG. 3 after the BMCA has been executed.

FIG. 4 shows the system from FIG. 3 after the BMCA has been executed. Functional unit 208 provides the grandmaster clock of the system, indicated by the clock symbol. When synchronizing the timers in the respective control devices of the system, the time synchronization messages are corrected and forwarded up to six times: First, a time synchronization message is transmitted from the grandmaster clock in functional unit 208 to switch 202. Switch 202 corrects the time information a first time before it in turn transmits a time synchronization message to switch 206. Switch 206 corrects the time information a second time before it transmits a time synchronization message to functional unit 214. Functional unit 214 corrects the time information a third time before it transmits a time synchronization message to control device 220. Control device 220 corrects the time information a fourth time before it transmits a time synchronization message to control device 222. Finally, control device 222 corrects the time information a fifth time before it transmits a time synchronization message to control device 224. Control device 224 will itself make a sixth correction to the time information even if it does not forward the time synchronization message. The path of the time synchronization message is illustrated by the solid arrows.

It is easy to see that the possible deviation of the time information is greatest in control device 224; at least the uncertainty about the deviation is greatest for this control device. In systems, it is often the case that sensors are arranged right at the outermost ends of a network and the timestamps assigned to the acquired measured values may accordingly have a high possible deviation. In order to reduce the greatest possible deviation, it is ascertained according to the invention whether another functional unit or a switch within the server-based control device 200 is suitable as a grandmaster clock and is also located even closer to an interface to external sub-networks.

Figure 5:
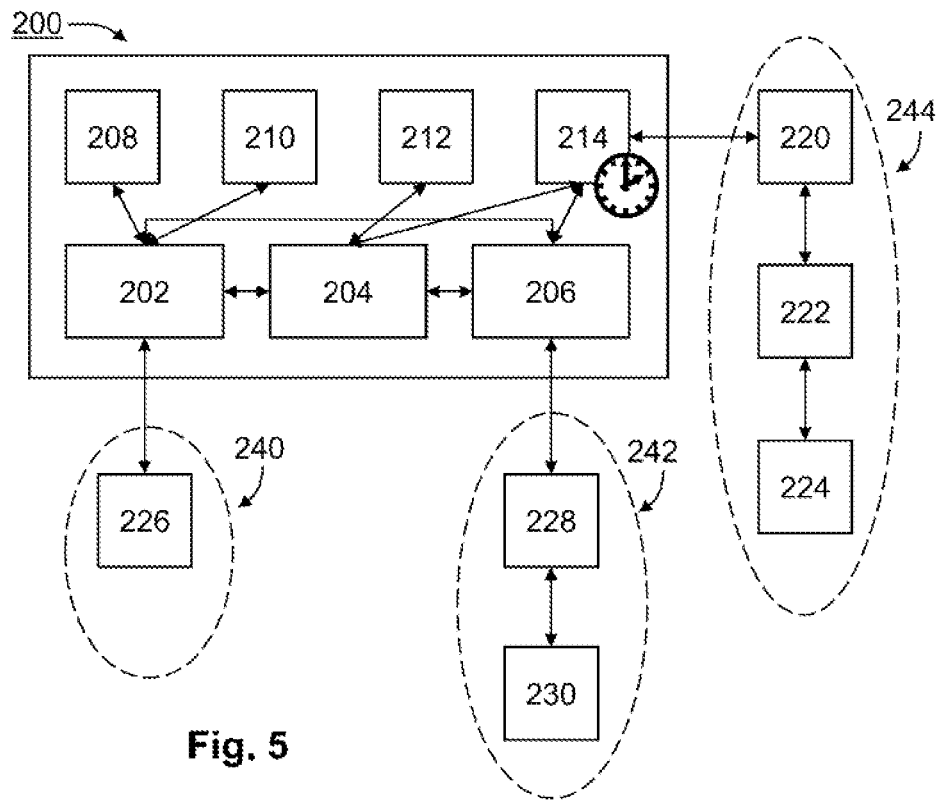
FIG. 5 shows the system from FIG. 3 after the inventive relocation of the grandmaster clock within the server-based control device according to a first aspect of the invention.

FIG. 5 shows the system from FIG. 3 after ascertaining a functional unit within the server-based control device 200 that satisfies the conditions and following the relocation of the grandmaster clock within the server-based control device 200, according to a first embodiment of the invention. In this example, this is functional unit 214, which on the one hand has its own network interface to an external sub-network, and on the other hand requires the smallest possible number of forwarding operations or corrections of the time synchronization message in relation to all other switches, functional units and control devices of the system. In the example shown in the figure, there are three of these at most.

Figure 6:
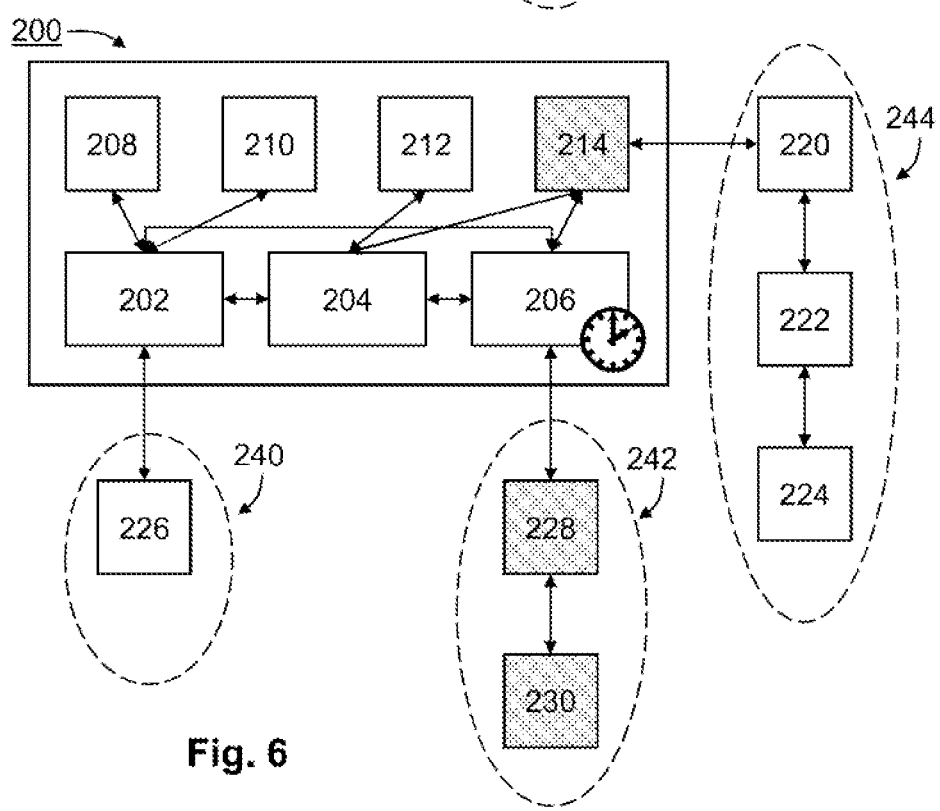
FIG. 6 shows the system from FIG. 3 after the inventive relocation of the grandmaster clock within the server-based control device according to a second aspect of the invention.

FIG. 6 shows the system from FIG. 3 after the inventive relocation of the grandmaster clock within the server-based control device 200 according to a second embodiment of the invention. In this example, the control devices 228 and 230 have particularly high time synchronization demands. Network switch 206 is itself suitable for providing the grandmaster clock. Relocating the grandmaster clock to network switch 206 offers the smallest possible number of forwarding operations in relation to the control devices that make the high demands, specifically two at most, and still has a comparatively small number of forwarding operations for the other functional units and control devices.

In addition, processing of the data coming from the control devices 228 and 230 may be relocated to the functional unit 214, such that the data may also be forwarded with as few intermediate stations as possible.

Figure 7:
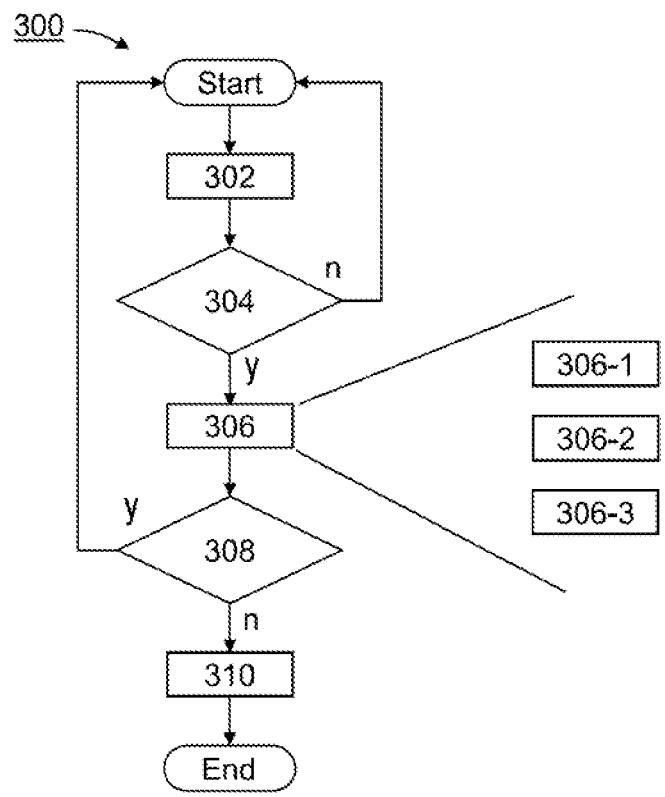
FIG. 7 shows a schematic flowchart of one aspect of the method according to the invention.

FIG. 7 shows a flowchart of an exemplary method 300 according to the invention. In step 302, the best clock of the network is first determined, for example by applying the Best Master Clock algorithm in accordance with IEEE 802.1AS. In step 304, it is checked whether the grandmaster clock is located within the server-based control device. If this is not the case, "n" branch from step 304, the method is ended. The method may be restarted at the next execution of the BMCA. If the grandmaster clock is located within the server-based control device, "y" branch from step 304, in step 306, the functional unit within the server-based control device that is suitable as a grandmaster clock and that has the smallest average distance from all selected network interfaces is ascertained. If the grandmaster clock determined in step 302 is provided by the functional unit ascertained in step 306, "y" branch from step 308, the method is ended. Otherwise, "n" branch from step 308, in step 310, the grandmaster clock is moved to the functional unit ascertained in step 306, and the method is ended. The method may be restarted at the next execution of the BMCA.

Step 306 may comprise a step 306-1 involving selecting functional units that could be candidates for a move of the grandmaster clock. This may comprise a check of the clock parameters of the functional units in question and a comparison with minimum demands of the clock parameters. The clock parameters are contained for example in Announce messages of the gPTP protocol.

Step 306 may furthermore comprise a step 306-2 involving ascertaining the distances from selected functional units to selected active network interfaces that connect the server-based control device to an external network or sub-network. All active network interfaces may be determined for this purpose. Active network interfaces may be ascertained for example via propagation time measurements of messages between in each case two neighboring network nodes; if a significantly increased propagation time is measured between two network nodes compared to other pairs of network nodes, it may be assumed that the connection is not located within a server-based control device and is therefore a network interface to a sub-network located outside of the server-based control device.

Step 306 may furthermore comprise a step 306-3 in which the previously ascertained functional unit with the smallest average distance to all selected network interfaces is defined as the defined grandmaster clock.

Figure 8:
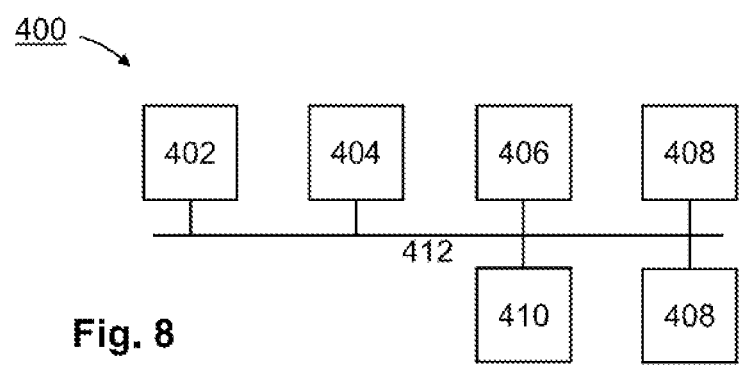
FIG. 8 shows a schematic block diagram of a functional unit of a server-based control device implementing the method.

FIG. 8 shows an exemplary block diagram of a network device 400 configured so as to carry out the method according to the invention. In addition to a microprocessor 402, the network device 400 comprises volatile and non-volatile memory 404, 406, two communication interfaces 408 and a synchronizable timer 410. The elements of the network device are connected to one another in terms of communication via one or more data connections or data buses 412. The communication interfaces 408 may be logical interfaces or ports implemented via a physical interface, or separate physical interfaces. The non-volatile memory 406 contains program instructions that, when they are executed by the microprocessor 402, implement at least one embodiment of the method according to the invention.

LIST OF REFERENCE SIGNS 100 network devices
200 server-based control device 202 switches
206
208 functional units
214
220 control devices
230
240 sub-networks
244
300 method
302 method steps
310
400 functional unit
402 microprocessor
404 RAM
406 ROM
408 communication interface
410 timer
412 bus

The invention claimed is:

1. A method for defining a grandmaster clock in a system of control devices networked with one another via a first network or multiple first sub-networks, wherein at least one of the networked control devices is a server-based control device that combines multiple functional units that are suitable as a source of the grandmaster clock and are connected in terms of communication within the server-based control device by way of a second network via switches in one physical unit, which is connected to the first network or multiple first sub-networks via one or more network interfaces, comprising:
ascertaining, by applying a Best Master Clock algorithm, a best clock of the system of control devices,
wherein the method comprises, when the best clock is located in a server-based control device:
ascertaining a plurality of distances between functional units, which are suitable as a source of the grandmaster clock, and active network interfaces that connect the server-based control device to the first network or multiple first sub-networks,
determining, for each of the functional units, which are suitable as a source of the grandmaster clock, a respective average distance to all selected network interfaces, and
defining, as a defined grandmaster clock for the first network or the first sub-networks, a functional unit that has a smallest average distance to all network interfaces of the system of control devices.

2. The method as claimed in claim 1, wherein the functional units, which are suitable as a source of the grandmaster clock, are all functional units of the server-based control device that are suitable as a source of the grandmaster clock, and the distances to the active network interfaces are ascertained for the clocks of all the functional units of the system of control devices.

3. The method as claimed in claim 1, wherein the functional units, which are suitable as a source of the grandmaster clock, are those functional units of the server-based control device that meet predetermined minimum demands with respect to timer parameters, and wherein the distances to the selected active network interfaces are ascertained only for the clocks of the functional units, which are suitable as a source of the grandmaster clock.

4. The method as claimed in claim 1, wherein the functional units, which are suitable as a source of the grandmaster clock, are those functional units of the server-based control device that forward the time synchronization messages of the best clock to a network interface, and wherein the distances to the selected active network interfaces are ascertained only for the clocks of the functional units, which are suitable as a source of the grandmaster clock.

5. The method as claimed in claim 1, wherein the active network interfaces are all active network interfaces of the server-based control device.

6. The method as claimed in claim 1, wherein the active network interfaces are only network interfaces of the server-based control device that connect first sub-networks to which control devices that execute a time-critical application are connected.

7. The method as claimed in claim 1, wherein the defined grandmaster clock within the server-based control device is synchronized with the best clock ascertained by applying the Best Master Clock algorithm.

8. The method as claimed in claim 7, wherein the defined grandmaster clock receives time synchronization messages in a base time domain from a best clock ascertained within the server-based control device by applying the Best Master Clock algorithm and exchanges an identification of the clock contained in the received time synchronization messages for its own identification before it retransmits the time synchronization messages into the first network or the first sub-networks.

9. The method as claimed in claim 1, wherein ascertaining the best clock comprises:
executing the Best Master Clock Algorithm (BMCA) in accordance with Institute of Electrical and Electronics Engineers Standard for Local and Metropolitan Area Networks—Timing and Synchronization for Time-Sensitive Applications in Bridged Local Area Networks (IEEE 802.1AS).

10. A non-transitory computer-readable medium having stored thereon computer executable instructions that, when executed by a processor of a functional unit of a server-based control device, define a grandmaster clock in a system of control devices networked with one another via a first network or multiple first sub-networks, wherein at least one of the networked control devices is the server-based control device, wherein the server-based control device combines multiple functional units that are suitable as a source of the grandmaster clock and are connected in terms of communication within the server-based control device by way of a second network via switches in one physical unit, which is connected to the first network or multiple first sub-networks via one or more network interfaces, by performing operations comprising:
ascertaining, by applying a Best Master Clock algorithm, a best clock of the system of control devices,
wherein, when the best clock is located in a server-based control device:
ascertaining a plurality of distances between functional units, which are suitable as a source of the grandmaster clock, and active network interfaces that connect the server-based control device to the first network or multiple first sub-networks,
determining, for each of the functional units, which are suitable as a source of the grandmaster clock, a respective average distance to all selected network interfaces, and
defining, as a defined grandmaster clock for the first network or the first sub-networks, a functional unit that has a smallest average distance to all network interfaces of the system of control devices.

11. The non-transitory computer-readable medium as claimed in claim 10, wherein the functional units, which are suitable as a source of the grandmaster clock, are all functional units of the server-based control device that are suitable as a source of the grandmaster clock, and the distances to the active network interfaces are ascertained for the clocks of all the functional units of the system of control devices.

12. The non-transitory computer-readable medium as claimed in claim 10, wherein the functional units, which are suitable as a source of the grandmaster clock, are those functional units of the server-based control device that meet predetermined minimum demands with respect to timer parameters, and wherein the distances to the selected active network interfaces are ascertained only for the clocks of the functional units, which are suitable as a source of the grandmaster clock.

13. The non-transitory computer-readable medium as claimed in claim 10, wherein the functional units, which are suitable as a source of the grandmaster clock, are those functional units of the server-based control device that forward the time synchronization messages of the best clock to a network interface, and wherein the distances to the selected active network interfaces are ascertained only for the clocks of the functional units, which are suitable as a source of the grandmaster clock.

14. The non-transitory computer-readable medium as claimed in claim 10, wherein the active network interfaces are all active network interfaces of the server-based control device.

15. The non-transitory computer-readable medium as claimed in claim 10, wherein the active network interfaces are only network interfaces of the server-based control device that connect first sub-networks to which control devices that execute a time-critical application are connected.

16. The non-transitory computer-readable medium as claimed in claim 10, wherein the defined grandmaster clock within the server-based control device is synchronized with the best clock ascertained by applying the Best Master Clock algorithm.

17. The non-transitory computer-readable medium as claimed in claim 16, wherein the defined grandmaster clock receives time synchronization messages in a base time domain from a best clock ascertained within the server-based control device by applying the Best Master Clock algorithm and exchanges an identification of the clock contained in the received time synchronization messages for its own identification before it retransmits the time synchronization messages into the first network or the first sub-networks.

18. A vehicle having a server-based control device, the server-based control device having multiple functional units connected to one another in terms of communication via a second network and at least one switch, wherein a network interface of a functional unit or of a switch connects the second network to a first network, or multiple network interfaces of functional units or switches connect the second network to in each case one of multiple first sub-networks that is or are located outside of the server-based control device, wherein two or more of the functional units or switches are configured to define a grandmaster clock, wherein the server-based control device combines multiple functional units that are suitable as a source of the grandmaster clock, by performing operations comprising:

ascertaining, by applying a Best Master Clock algorithm, a best clock of the system of control devices,
wherein, when the best clock is located in a server-based control device:
ascertaining a plurality of distances between functional units, which are suitable as a source of the grandmaster clock, and active network interfaces that connect the server-based control device to the first network or multiple first sub-networks,
determining, for each of the functional units, which are suitable as a source of the grandmaster clock, a respective average distance to all selected network interfaces, and
defining, as a defined grandmaster clock for the first network or the first sub-networks, a functional unit that has a smallest average distance to all network interfaces of the system of control devices.

19. The vehicle as claimed in claim 18, wherein the functional units, which are suitable as a source of the grandmaster clock, are all functional units of the server-based control device that are suitable as a source of the grandmaster clock, and the distances to the active network interfaces are ascertained for the clocks of all the functional units of the system of control devices.

20. The vehicle as claimed in claim 18, wherein the functional units, which are suitable as a source of the grandmaster clock, are those functional units of the server-based control device that meet predetermined minimum demands with respect to timer parameters, and wherein the distances to the selected active network interfaces are ascertained only for the clocks of the functional units, which are suitable as a source of the grandmaster clock.

21. The vehicle as claimed in claim 18, wherein the functional units, which are suitable as a source of the grandmaster clock, are those functional units of the server-based control device that forward the time synchronization messages of the best clock to a network interface, and wherein the distances to the selected active network interfaces are ascertained only for the clocks of the functional units, which are suitable as a source of the grandmaster clock.

22. The vehicle as claimed in claim 18, wherein the active network interfaces are all active network interfaces of the server-based control device.

23. The vehicle as claimed in claim 18, wherein the active network interfaces are only network interfaces of the server-based control device that connect first sub-networks to which control devices that execute a time-critical application are connected.

24. The vehicle as claimed in claim 18, wherein the defined grandmaster clock within the server-based control device is synchronized with the best clock ascertained by applying the Best Master Clock algorithm.

25. The vehicle as claimed in claim 24, wherein the defined grandmaster clock receives time synchronization messages in a base time domain from a best clock ascertained within the server-based control device by applying the Best Master Clock algorithm and exchanges an identification of the clock contained in the received time synchronization messages for its own identification before it retransmits the time synchronization messages into the first network or the first sub-networks.

* * * * *